Sept. 25, 1934.    D. J. CAMPBELL    1,974,949
METHOD OF PRODUCING COMPOSITE BRAKE DRUMS
Filed June 8, 1931
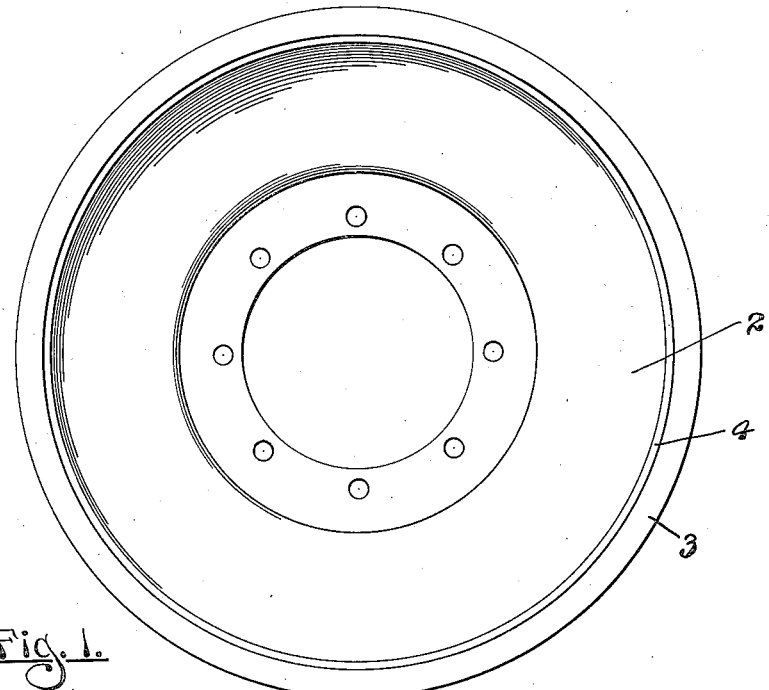
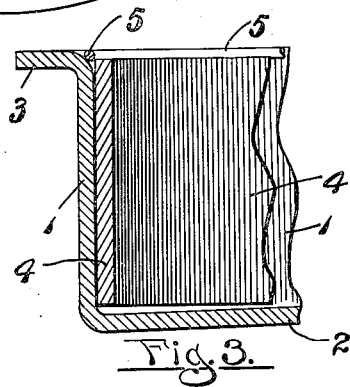
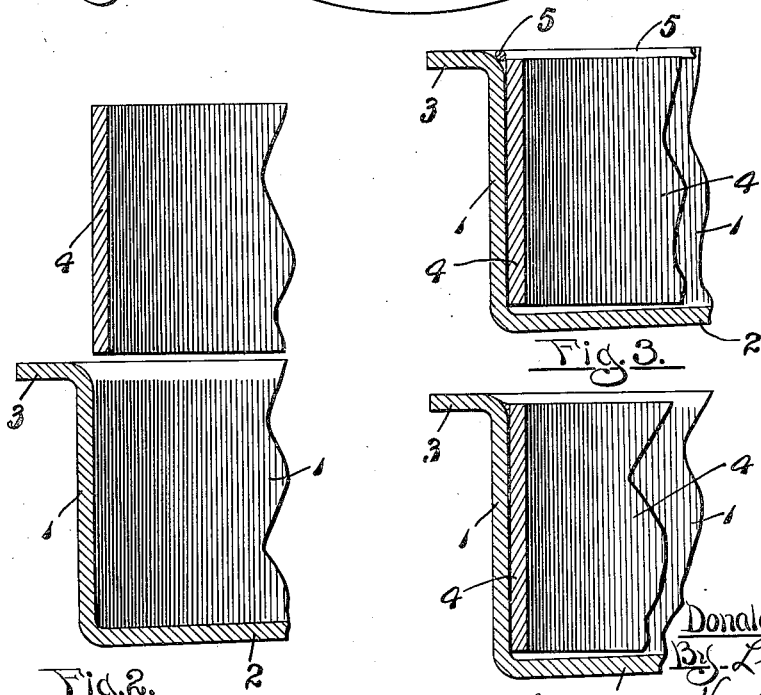
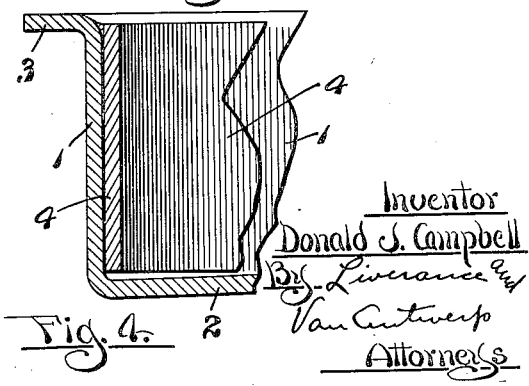
Inventor
Donald J. Campbell
By Liverance and
Van Antwerp
Attorneys Patented Sept. 25, 1934

1,974,949

UNITED STATES PATENT OFFICE 1,974,949

METHOD OF PRODUCING COMPOSITE BRAKE DRUMS

Donald J. Campbell, Muskegon Heights, Mich., assignor to Campbell, Wyant & Cannon Foundry Company, Muskegon Heights, Mich., a corporation of Michigan Application June 8, 1931, Serial No. 542,737

3 Claims. (Cl. 29—152.2)

This invention relates to a composite brake drum structure and method of producing the same.

I have heretofore filed application for patent, Serial No. 512,792, filed February 2, 1931, relating to the centrifugal depositing of molten cast iron at the inner side of an annular band of a brake drum or other cylindrical structure, preformed into shape and in readiness to receive the cast iron when it is deposited thereagainst. With such process of centrifugal casting the inner lining band of cast metal against the drum has a substantially integral fused connection of the two metals produced at their juncture, which inseparably joins the cast metal lining to the outer pressed, rolled or otherwise formed band or drum.

With the present invention it is an object and purpose thereof to cast the band separate from the preformed drum, machine at its outer side so that it will have a slightly larger diameter than the inner diameter of the annular band of the brake drum to which it is to be applied, thereafter heating the brake drum band either before or after it is welded to the back or web of the drum so that the cast metal band may be received therein, whereby with cooling the brake drum band it will shrink upon the cast metal lining and very tightly connect therewith. This alone, however, is not sufficient to provide the necessary connection between the cast metal and the pressed, rolled or formed metal especially as in the use of the drum in an automobile, severe heat and high degrees of temperature are generated by the friction of the brakes against the brake drum. This expands the metals, and the same having different coefficients of expansion are quite liable to separate, and in addition the strains to which the brake drum is subjected in service may cause deformation of the outer preformed member of the drum and cause a separation thereof from the inner cast metal band.

Therefore, it is a further object and purpose of my invention to in effect braze the two parts of the brake drum together, using a suitable brazing metal which may be laid at the outer edges of the joint between the cast metal lining and the outer drum member, subjecting the whole to heat and a high degree of temperature in a suitable furnace, such as an electric furnace, whereupon the brazing material is melted and passes between the two members of the drum flowing and making an intimate binding or brazing connection of the two which for practical purposes renders the two parts or members of the brake drum construction in effect integral.

An understanding of the invention for the attainment of the ends stated may be had from the following description, taken in connection with the accompanying drawing, in which, Fig. 1 is an elevation of the completed brake drum.

Fig. 2 is a fragmentary enlarged section through one side of the two members of the brake drum prior to their being brazed together.

Fig. 3 illustrates the two members of the brake drum with the cast metal lining within the outer member and the brazing member located in place prior to the introduction thereof into a furnace, and Fig. 4 illustrates the completed brazed drum with the lining having a brazed and, in effect, integral connection with the outer member.

Like reference characters refer to like parts in the different figures of the drawing.

The outer brake drum member, rolled, pressed or otherwise formed from metal has a continuous annular band 1 connected with a back or web 2. In practice the band at its free edge is many times formed with a reinforced and strengthening flange 3 though so far as the invention is concerned this flange is not needed nor required. Many times the annular section 1 of the drum is formed separately from the web or back 2, and later they are welded together; and my invention may be utilized either before or after the annular section 1 is connected to the back or web 2. The lining 4 of cast metal, preferably cast iron, is cast in a suitable mold in an annular ring-like form and with my invention is machined at its outer side so that it will have an exterior diameter slightly larger than the inner diameter of the part 1 of the outer member at normal atmospheric temperatures.

In order that the cast metal lining may be inserted within the part 1, said part 1 or, if it has been welded to the back 2, the entire outer member of the drum is heated to a sufficiently high degree of temperature that it will be expanded so that the inner diameter of the section 1 is greater than the outer diameter of the colder cast metal band 4 which may then be inserted in place. This is illustrated in Fig. 3.

At the joint at the outer edge of the lining 4 between it and the surrounding section 1 of the outer drum member, a suitable brazing material, copper or its equivalent, is laid preferably in the form of a wire indicated at 5. The drum with the wire thus positioned is then placed in a furnace and the whole heated to a temperature such that the copper wire 5 or other equivalent brazing material melts and passes into the joint between the lining and the outer drum section 1. No large quantity of the brazing material is required because of the very tight, in fact shrink fit of the part 1 around the cast metal band. Any and all interstices between the two parts are filled with the melted brazing material and a complete bond between the lining and the outer member of the brake drum is made.

This invention produces very satisfactory brake drums with an insurance that the inner lining of cast metal will not separate from the outer member at any point which, if it occurs, results in cracking of the inner lining due, it is believed, to the development of very high temperatures in the lining, as the heat cannot escape therefrom if there is anything less than in effect an integral connection between the inner band and the outer member of the drum. The brazing process herein described provides such connection allowing the escape of heat. Furthermore, the bond between the lining and the outer member of the drum serves to insure against any rotative movement of one with respect to the other and also that the outer pressed or rolled member of the construction will not separate from the lining of cast iron through distortion due to strains to which a brake drum is subjected in service.

The invention while it has been described specifically as applied to automobile brake drums is in no sense limited exclusively thereto but is to be considered applicable in all places of use where it can be used and to comprehend all forms of structure coming within the scope of the invention as defined by the appended claims.

I claim:

1. The process of making brake drums which consists, in providing a continuous annular outer band formed of sheet metal with the inherent irregularities therein, casting a continuous annular band, machining the same at its outer side to provide a band having an exterior diameter slightly greater than the least interior diameter of said continuous outer band, heating the outer band to expand the same, inserting the cast band therewithin, placing a metal of comparatively low melting point above the juncture between the outer band and the said annular band, and thereafter subjecting the composite structure to heat sufficient to melt the said metal whereby the same flows downwardly between the two bands and completely fills the irregular space therebetween for the purpose described.

2. The herein described method of producing a brake drum which comprises, forming an outer annular continuous drum flange from metal adapted to be pressed or rolled into shape, inserting a cast metal band within the drum flange, said cast metal band having a greater normal exterior diameter than the inner normal diameter of the said drum flange, applying a brazing metal at the joint between the said drum flange and inner band, and subjecting all to heat treatment whereby the brazing metal is melted and fills interstices between the flange and inner band and provides a brazing connection between said flange and inner band whereby an even and uniform heat flow is had therethrough.

3. The herein described method of producing a brake drum which comprises, forming an outer annular continuous drum flange from steel sheet metal adapted to be pressed or rolled into shape, heating the drum flange and inserting a cast metal band of cast iron within the drum flange, said cast metal band having a greater normal exterior diameter than the inner normal diameter of the said drum flange, applying copper at the joint between the said drum flange and inner band, and subjecting all to heat treatment whereby the copper is melted and fills interstices between the flange and inner band and whereby an even and uniform heat flow is had therethrough.

DONALD J. CAMPBELL.